US011485483B2

(12) United States Patent
Ni

(10) Patent No.: US 11,485,483 B2
(45) Date of Patent: Nov. 1, 2022

(54) UNDERCARRIAGE AND UNMANNED AERIAL VEHICLE (UAV) HAVING UNDERCARRIAGE

(71) Applicant: AUTEL ROBOTICS CO., LTD., Guangdong (CN)

(72) Inventor: Feng Ni, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 286 days.

(21) Appl. No.: 16/731,941

(22) Filed: Dec. 31, 2019

(65) Prior Publication Data

US 2020/0148337 A1    May 14, 2020

Related U.S. Application Data

(63) Continuation of application No. PCT/CN2018/083168, filed on Apr. 16, 2018.

(51) Int. Cl.
*B64C 25/14* (2006.01)
*B64C 25/24* (2006.01)
(Continued)

(52) U.S. Cl.
CPC .............. *B64C 25/14* (2013.01); *B64C 25/12* (2013.01); *B64C 25/24* (2013.01); *B64C 39/024* (2013.01); *B64C 2201/027* (2013.01)

(58) Field of Classification Search
CPC ......... B64C 25/10; B64C 25/12; B64C 25/14; B64C 25/18; B64C 25/20; B64C 25/24; B64C 2025/125
See application file for complete search history.

(56) References Cited

U.S. PATENT DOCUMENTS 2,021,439 A  *  11/1935  Wells ..................... B64C 25/10
                                                                244/102 R
9,242,729 B1 *  1/2016  Wang ..................... G05D 1/042
(Continued)

FOREIGN PATENT DOCUMENTS

CN        205602095 U        9/2016
CN        106005377 A       10/2016
(Continued)

OTHER PUBLICATIONS

International Search Report dated Jul. 4, 2018; PCT/CN2018/083168.

*Primary Examiner* — Richard G Davis

(57) ABSTRACT

Embodiments of the present invention relate to the technical field of aircrafts, and provide an undercarriage and an unmanned aerial vehicle (UAV) having the undercarriage. The undercarriage includes a power assembly and an undercarriage body. The power assembly includes a connecting member and a drive apparatus for driving the connecting member to reciprocate. The undercarriage body includes a plurality of hinged connecting rods, the plurality of hinged connecting rods constituting at least one parallelogram mechanism, and projections of at least two of the hinged connecting rods on a side face of the fuselage are staggered. The undercarriage body is connected to the connecting member, and when the connecting member reciprocates, the undercarriage body is driven to be folded or unfolded. In the foregoing manner, driven by the reciprocating motion of the connecting member, the undercarriage body may be retracted and folded on two sides or in an interior of the fuselage, so that the undercarriage may be retracted and folded during flight of the UAV, thereby avoiding unnecessary resistance in the air.

13 Claims, 7 Drawing Sheets

(51) Int. Cl.
*B64C 39/02* (2006.01)
*B64C 25/12* (2006.01)

(56) References Cited

U.S. PATENT DOCUMENTS

| | | | |
|---|---|---|---|
| 2012/0111999 A1* | 5/2012 | Acks | B64C 25/34 |
| | | | 244/102 A |
| 2014/0263823 A1* | 9/2014 | Wang | B64C 27/08 |
| | | | 244/17.23 |
| 2016/0144952 A1 | 5/2016 | Acks et al. | |
| 2016/0207611 A1* | 7/2016 | Fenny | B64C 25/60 |
| 2017/0101174 A1* | 4/2017 | Ou | B64C 39/024 |

FOREIGN PATENT DOCUMENTS

| | | |
|---|---|---|
| CN | 106741994 A | 5/2017 |
| CN | 207072432 U | 3/2018 |

\* cited by examiner

US 11,485,483 B2

UNDERCARRIAGE AND UNMANNED AERIAL VEHICLE (UAV) HAVING UNDERCARRIAGE

CROSS-REFERENCE

The application is a continuation of International Patent Application No. PCT/CN2018/083168 filed on Apr. 16, 2018, which claims priority of Chinese Patent Application No. 201720790960.1 filed on Jul. 1, 2017, both of which are incorporated by reference in their entireties.

BACKGROUND

Technical Field

The present invention relates to the technical field of aircrafts, and in particular, to an undercarriage and an unmanned aerial vehicle (UAV) having the undercarriage.

Related Art

An unmanned aerial vehicle (UAV for short) is a new concept device under rapid development, which has the advantages of maneuverability, quick response, unmanned operation and low operation requirements. The UAV carries a plurality of types of sensors or photographing devices, to implement real-time image transmission and detection of high-risk areas, which is a powerful complement to satellite remote sensing and traditional aerial remote sensing. At present, the range of use of UAV has been expanded to three major areas such as military, scientific research and civilian use, and specifically widely used in fields such as power communication, meteorology, agriculture, marine, exploration, photography, disaster prevention and mitigation, crop evaluation, anti-drug and anti-smuggling, border patrol, public security and counter terrorism, etc.

Currently, a consumer UAV on the market mainly uses a fixed undercarriage. During aerial photography, the fixed undercarriage shields aerial vision.

SUMMARY

In order to resolve the foregoing technical problem, embodiments of the present invention provide a foldable undercarriage that may be stowed and folded, and an unmanned aerial vehicle (UAV) having the foldable undercarriage.

In order to resolve the foregoing technical problem, the embodiments of the present invention provide the following technical solutions.

An undercarriage applied to an unmanned aerial vehicle (UAV), the UAV including a fuselage, and the undercarriage including: a power assembly and an undercarriage body, where the power assembly is configured to be mounted to the fuselage, and the power assembly includes a connecting member and a drive apparatus for driving the connecting member to reciprocate; an undercarriage body including a plurality of hinged connecting rods, the plurality of hinged connecting rods constituting at least one parallelogram mechanism, and projections of at least two of the hinged connecting rods on a side face of the fuselage being staggered; the undercarriage body being connected to the connecting member, and when the connecting member reciprocates, the undercarriage body being driven to be folded or unfolded.

In some embodiments, the undercarriage body includes a first connecting rod, a second connecting rod, a third connecting rod, a fourth connecting rod and a fifth connecting rod; one end of the first connecting rod being hinged to the connecting member, the other end of the first connecting rod being hinged to one end of the fourth connecting rod, and the first connecting rod being hinged to the fuselage at a position between one end connected to the connecting member and the other end hinged to the fourth connecting rod; one end of the second connecting rod being hinged to the fuselage, and the other end being hinged to the third connecting rod and the fourth connecting rod, respectively; and one end of the third connecting rod being hinged to the second connecting rod, and the other end of the third connecting rod and the other end of the fourth connecting rod being hinged to the fifth connecting rod, respectively.

In some embodiments, one end of the third connecting rod is hinged to the second connecting rod, and one end of the hinge extends in a direction away from the fifth connecting rod and is hinged to the first connecting rod.

In some embodiments, the third connecting rod includes a first portion hinged to the first connecting rod and the second connecting rod, a curved portion connected to the first portion and a second portion connected to the first curved portion. Both the first portion and the second portion are disposed parallel to the fourth connecting rod.

In some embodiments, the undercarriage body includes a first connecting rod, a second connecting rod, a third connecting rod, a fourth connecting rod and a fifth connecting rod. One end of the first connecting rod is hinged to the connecting member, the other end of the first connecting rod is hinged to one end of the fourth connecting rod, and the first connecting rod is hinged to the fuselage at a position between one end connected to the connecting member and the other end hinged to the fourth connecting rod; One end of the second connecting rod is hinged to the fuselage, and the other end is hinged to the third connecting rod or the fourth connecting rod. One end of the third connecting rod is hinged to the first connecting rod, and the other end of the third connecting rod and the other end of the fourth connecting rod are hinged to the fifth connecting rod, respectively.

In some embodiments, the fourth connecting rod includes a second curved portion hinged to the first connecting rod and a vertical portion connected to the second curved portion. The vertical portion is connected between the second curved portion and the fifth connecting rod.

In some embodiments, the fifth connecting rod includes a third portion hinged to the third connecting rod and the fourth connecting rod, a third curved portion connected to the third portion and a fourth portion connected to the third curved portion.

In some embodiments, the undercarriage further includes a skid, the skid being connected to the fifth connecting rod.

In some embodiments, projections of the first connecting rod and the second connecting rod on a side face of the fuselage are staggered.

In some embodiments, the first connecting rod includes a first side plate and a second side plate that are disposed opposite to each other at an interval, and the fifth connecting rod includes a third side plate and a fourth side plate that are disposed opposite to each other at an interval.

One end of the third connecting rod is hinged to the first connecting rod through a third pin shaft, and the other end is hinged to the fifth connecting rod through a seventh pin shaft. The third pin shaft is inserted between the first side plate and the second side plate, one end of the third pin shaft extending in a direction away from the second side plate. The seventh pin shaft is inserted between the third side plate and the fourth side plate, one end of the seventh pin shaft extending in a direction away from the fourth side plate.

One end of the fourth connecting rod is hinged to the first connecting rod through a fourth pin shaft, and the other end is hinged to the fifth connecting rod through an eighth pin shaft. The fourth pin shaft is inserted between the first side plate and the second side plate, and one end of the fourth pin shaft extending in a direction away from the first side plate. The eighth pin shaft is inserted between the third side plate and the fourth side plate, one end of the eighth pin shaft extending in a direction away from the third side plate.

One end of the third connecting rod is hinged to one end that is of the third pin shaft and that extends away from the second side plate, and the other end of the third connecting rod is hinged to one end that is of the seventh pin shaft and that extends in a direction away from the fourth side plate. One end of the fourth connecting rod is hinged to one end that is of the fourth pin shaft and that extends in a direction away from the first side plate, and the other end of the fourth connecting rod is hinged to one end that is of the eighth pin shaft and that extends in a direction away from the third side plate.

In some embodiments, the fuselage further includes a reinforcing member, the reinforcing member including a body portion connected to the fuselage and an extending portion with one end connected to the body portion, and the first connecting rod being hinged to the other end of the extending portion at a position between one end connected to the connecting member and the other end hinged to the fourth connecting rod.

In some embodiments, the power assembly includes a threaded rod connected to the drive apparatus, the connecting member being sleeved on the threaded rod and being screwed to the threaded rod, the drive apparatus driving the threaded rod to rotate, and the connecting member reciprocating along the threaded rod.

In some embodiments, a middle portion of the connecting member is screwed to the threaded rod, the connecting member being further provided with sliding grooves on both sides of a portion screwed to the threaded rod, and one end of the first connecting rod being hinged in the sliding groove and sliding along the sliding groove.

In order to resolve the foregoing technical problem, the embodiments of the present invention further provide the following technical solutions.

An unmanned aerial vehicle (UAV) includes the foregoing undercarriage.

In comparison to the prior art, when the connecting member reciprocates, the undercarriage of the embodiment of the present invention may drive the undercarriage body to rotate to be folded or unfolded relative to the fuselage, and the undercarriage body may be retracted and folded on both sides or inside of the fuselage, so that the structure is compact, and the undercarriage may be retracted and folded without causing unnecessary resistance of the UAV in the air when the UAV having the undercarriage is in flight, thereby avoiding shielding aerial vision during aerial photography of the UAV. When landing is required, the undercarriage may be automatically unfolded to support the UAV to complete the landing. Further, when not in use, the UAV having the undercarriage may also be easy to pack and carry.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. As used in the specification, orientation or position relationships indicated by the terms such as "upper", "lower", "inside", "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention. In addition, the terms such as "first", "second", and "third" are used only for the purpose of description, and should not be understood as indicating or implying relative importance.

Unless otherwise defined, all technical and scientific terms used herein have the same meaning as commonly understood by one of ordinary skill in the art to which the present invention belongs. The terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

In embodiments of the present invention, an unmanned aerial vehicle (UAV) may be a single-rotor UAV, a double-rotor UAV, a four-rotor UAV or a six-rotor UAV. The four-rotor UAV is used as an example for detailed description.

Figure 1:
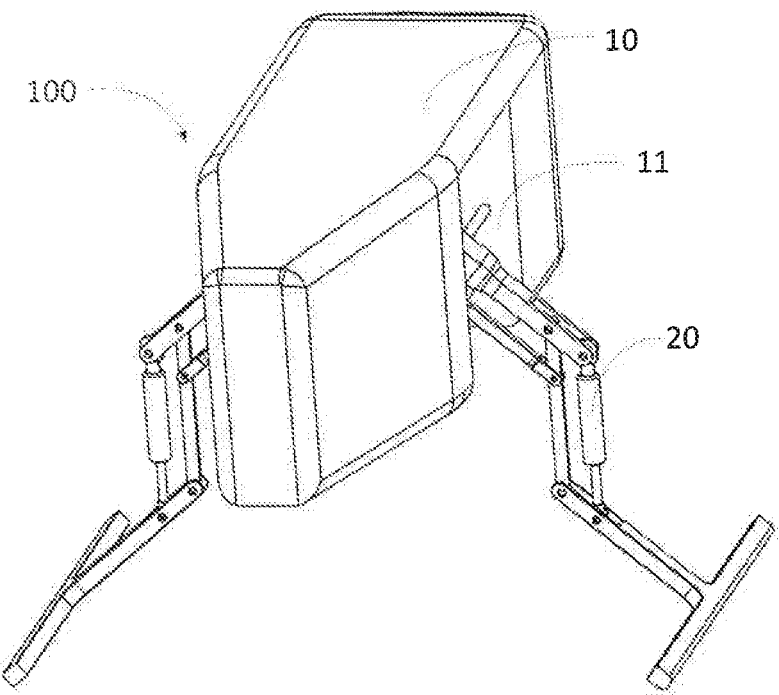
FIG. 1 is a three-dimensional view of an unmanned aerial vehicle according to one embodiment of the present invention, where an undercarriage is in an unfolded state.

Referring to FIG. 1, an embodiment of the present invention provides an unmanned aerial vehicle (UAV) 100 including a fuselage 10 and an undercarriage 20. The undercarriage 20 is mounted to the fuselage 10 and is configured to support the UAV at a landing site when the UAV 100 lands.

The fuselage 10 includes a control circuit assembly composed of electronic components such as an MCU. The control circuit assembly includes a plurality of control modules, for example, a control module for controlling the undercarriage 20 to be retracted and lowered, a flight control module for controlling a flight attitude of the UAV, GPS module for navigating the UAV, a data processing module for processing environmental information obtained by a relevant airborne device, and the like.

The fuselage 10 is provided with a receiving groove 11. When the undercarriage 20 is retracted, the receiving groove 11 receives the undercarriage 20.

Figure 2:
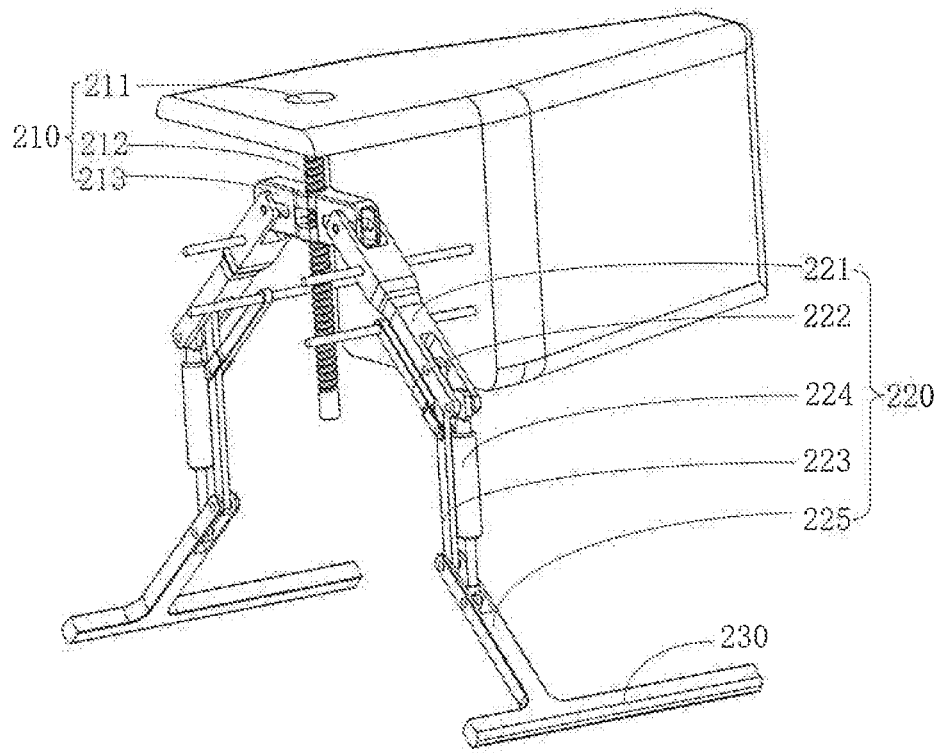
FIG. 2 is a cross-sectional view of the UAV shown in FIG. 1.

Referring to FIG. 2, the undercarriage 20 includes: a power assembly 210, an undercarriage body 220 and a skid 230. The power assembly 210 is configured to be disposed inside the fuselage 10, and the power assembly 210 is connected to the undercarriage body 220 to provide power for the undercarriage body 220. The undercarriage body 220 is connected to the skid 230. The power assembly 210 transmits power to the skid 230 through the undercarriage body 220, and the power assembly 210 drives the undercarriage body 220 and the skid 230 to rotate to be folded or unfolded relative to the fuselage 10.

Figure 3:
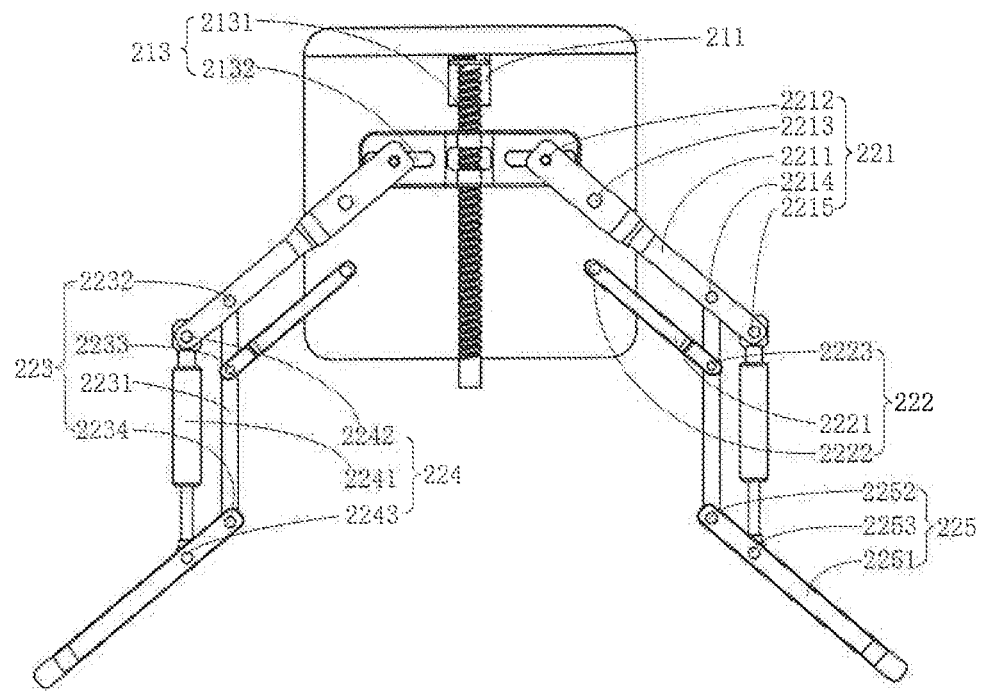
FIG. 3 is another cross-sectional view of the UAV shown in FIG. 1.

The power assembly 210 is mounted inside the fuselage 10. The power assembly 210 includes: a drive apparatus 211, a threaded rod 212 and a connecting member 213. The drive apparatus 211 is fixedly connected to the threaded rod 212, and is configured to drive the threaded rod 212 to rotate. The connecting member 213 is sleeved on the threaded rod 212, and may perform reciprocating linear motion along an axis direction of the threaded rod 212 as the threaded rod 212 rotates. The connecting member 213 is connected to the undercarriage body 220, and when the connecting member 213 reciprocates, the undercarriage body 220 may be driven to rotate to be folded or unfolded relative to the fuselage 10. Referring to FIG. 3, a middle portion of the connecting member 213 is provided with a threaded hole 2131, both sides of the threaded hole 2131 being provided with a sliding groove 2132, respectively.

It may be understood that, in this embodiment, the drive apparatus 211 includes a motor configured to drive the threaded rod 212 to rotate, further causing the connecting member 213 to perform reciprocating linear motion along an axis direction of the threaded rod 212 as the threaded rod 212 rotates. In some other embodiments, the power assembly 210 may include a drive apparatus 211 and a connecting member 213. The drive apparatus 211 may be one of an air cylinder or a hydraulic cylinder. The drive apparatus 211 drives the connecting member 213 to perform reciprocating linear motion.

In this embodiment, the undercarriage 20 includes a power assembly 210, two undercarriage bodies 220 and two skids 230. One undercarriage body 220 is connected to only one corresponding skid 230, and the two undercarriage bodies 220 are both connected to the connecting member 213. The two undercarriage bodies 220 are respectively disposed on two opposite sides of the fuselage 10.

In the embodiment of the present invention, one undercarriage 20 is disposed on the UAV 100. It may be understood that, in some other embodiments, the quantity of undercarriages 20 disposed on the UAV 100 may be set according to actual requirements. For example, the quantity of undercarriages 20 is two, three, or the like.

The undercarriage body 220 is a link mechanism including a plurality of hinged connecting rods, the plurality of hinged connecting rods constituting at least one parallelogram mechanism.

Specifically, the undercarriage body 220 includes a first connecting rod 221, a second connecting rod 222, a third connecting rod 223, a fourth connecting rod 224 and a fifth connecting rod 225. One end of the first connecting rod 221 is connected to the connecting member 213, and the other end of the first connecting rod 221 away from the connecting member 213 and the third connecting rod 223 are hinged to a first hinge point. The first connecting rod 221 and a position between one end connected to the connecting member 213 and the first hinge point and the fuselage 10 are hinged to a second hinge point. One end of the second connecting rod 222 and the third connecting rod 223 are hinged to a third hinge point, and the other end of the second connecting rod 222 away from the third connecting rod 223 and the fuselage 10 are hinged to a fourth hinge point. The other end of the first connecting rod 221 away from the connecting member 213 and one end of the fourth connecting rod 224 are further hinged to a firth hinge point, the first hinge point being closer to the connecting member 213 than the fifth hinge point. The other end of the third connecting rod 223 away from the first connecting rod 221 and one end of the fifth connecting rod 225 are hinged to a sixth hinge point. The other end of the fourth connecting rod 224 away from the first connecting rod 221 and the fifth connecting rod 225 are hinged to a seventh hinge point. A portion of the first connecting rod 221, all of the second connecting rod 222, a portion of the third connecting rod 223 and a portion of the fuselage 10 constitute a four-link mechanism, and the first hinge point, the second hinge point, the third hinge point and the fourth hinge point are four vertices of a parallelogram. Another portion of the first connecting rod 221, all of the third connecting rod 223, all of the fourth connecting rod 224 and a portion of the fifth connecting rod 225 constitute another four-link mechanism, and the first hinge point, the fifth hinge point, the sixth hinge point and the seventh hinge point are four vertices of another parallelogram.

The first connecting rod 221 includes a first connecting rod body 2211, a first pin shaft 2212, a second pin shaft 2213, a third pin shaft 2214 and a fourth pin shaft 2215. The first pin shaft 2212 is disposed at one end of the first connecting rod body 2211, and the fourth pin shaft 2215 is disposed at the other end of the first connecting rod body 2211. The second pin shaft 2213 is disposed on the first connecting rod body 2211 and is located between the first pin shaft 2212 and the fourth pin shaft 2215. The third pin shaft 2214 is disposed on the first connecting rod body 2211 and is located between the second pin shaft 2213 and the fourth pin shaft 2215. The first pin shaft 2212 is inserted into the sliding groove 2132 and may slide in the sliding groove 2132, so that the first connecting rod 221 is movably connected to the connecting member 213. The first connecting rod 221 is hinged to the fuselage 10 through the second pin shaft 2213. The first connecting rod 221 is hinged to one end of the third connecting rod 223 through the third pin shaft 2214. The first connecting rod 221 is hinged to one end of the fourth connecting rod 224 through the fourth pin shaft 2215.

The second connecting rod 222 includes a second connecting rod body 2221, a fifth pin shaft 2222 and a sixth pin shaft 2223, the fifth pin shaft 2222 and the sixth pin shaft 2223 being respectively disposed on both ends of the second connecting rod body 2221. The second connecting rod 222 is hinged to the fuselage 10 through the fifth pin shaft 2222.

The third connecting rod 223 includes a third connecting rod body 2231 and a seventh pin shaft 2234, the third connecting rod body 2231 being provided with a first shaft hole 2232 and a second shaft hole 2233. The first shaft hole 2232 is disposed at one end of the third connecting rod body 2231, and the seventh pin shaft 2234 is disposed at the other end of the third connecting rod body 2231. The second shaft hole 2233 is disposed on the third connecting rod body 2231 and is located between the first shaft hole 2232 and the seventh pin shaft 2234. The sixth pin shaft 2223 is inserted into the second shaft hole 2233, so that the second connecting rod 222 is hinged to the third connecting rod 223.

The fourth connecting rod 224 includes a fourth connecting rod body 2241 and an eighth pin shaft 2243, the fourth connecting rod body 2241 being provided with a third shaft hole 2242, and the third shaft hole 2242 and the eighth pin shaft 2243 being respectively disposed at both sides of the fourth connecting rod body 2241. The fourth pin shaft 2215 is inserted into the third shaft hole 2242, so that the first connecting rod 221 is hinged to the fourth connecting rod 224.

The fifth connecting rod 225 includes a fifth connecting rod body 2251. The fifth connecting rod body 2251 is provided with a fourth shaft hole 2252 and a fifth shaft hole 2253. The fourth shaft hole 2252 is provided at one end of the fifth connecting rod body 2251, and the fifth shaft hole 2253 is disposed on the fifth connecting rod body 2251 and is located between two ends of the fifth connecting rod body 2251. The seventh pin shaft 2234 is inserted into the fourth shaft hole 2252, so that the third connecting rod 223 is hinged to the fourth connecting rod 224. The eighth pin shaft 2243 is inserted into the fifth shaft hole 2253, so that the fourth connecting rod 224 is hinged to the fifth connecting rod 225.

A spacing between the second pin shaft 2213 and the third pin shaft 2214 is equal to a spacing between the fifth pin shaft 2222 and the sixth pin shaft 2223, and a spacing between the third pin shaft 2214 and the sixth pin shaft 2223 is equal to a spacing between the second pin shaft 2213 and the fifth pin shaft 2222. A spacing between the third pin shaft 2214 and the fourth pin shaft 2215 is equal to a spacing between the seventh pin shaft 2234 and the eighth pin shaft 2243, and a spacing between the third pin shaft 2214 and the seventh pin shaft 2234 is equal to a spacing between the fourth pin shaft 2215 and the eighth pin shaft 2243.

Figure 4:
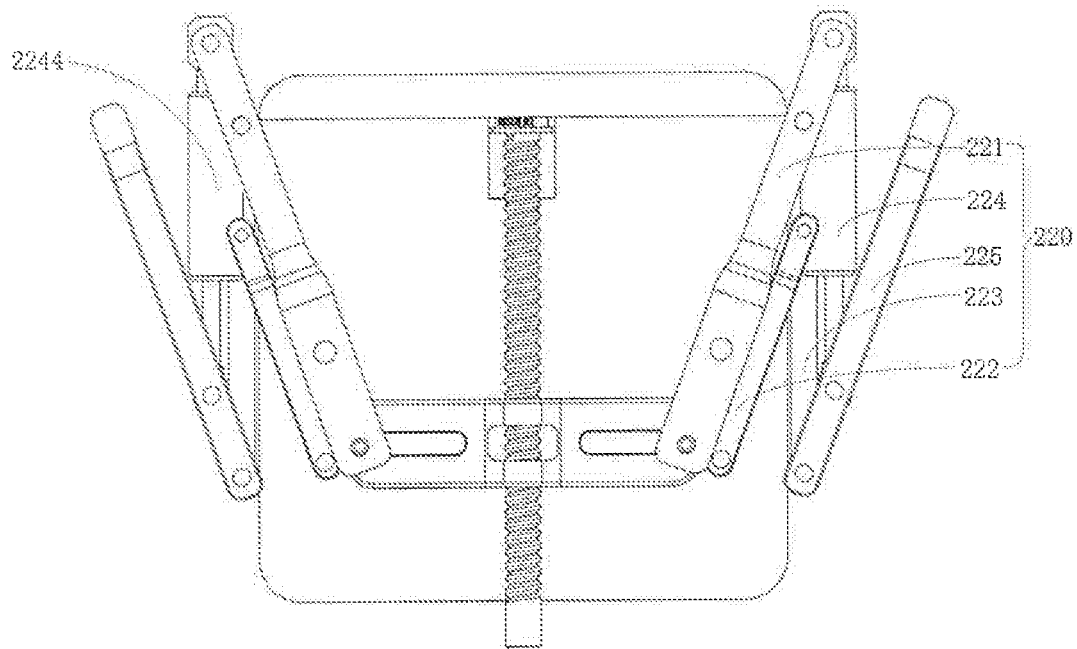
FIG. 4 is a cross-sectional view of the UAV shown in FIG. 3, where an undercarriage is in a folded state.

Referring to FIG. 4, in one of the embodiments, the fourth connecting rod 224 is a buffer rod, and includes a buffer and vibration damping apparatus 2244 used for buffering and reducing vibration when the UAV 100 is landing. The buffer and vibration damping apparatus 2244 may be a hydraulic cylinder buffer or an elastic buffer. After the undercarriage 20 of the UAV 100 is in contact with the ground, the undercarriage 20 may rotate due to a force. The buffer and vibration damping apparatus 2244 provides a torsional elastic force, so that the undercarriage 20 may play a role of buffering and vibration damping, preventing damage to the UAV 100 as a result of descending too fast when the UAV is landing. It may be understood that, in some other embodiments, the buffer and vibration damping apparatus 2244 may be omitted, and the fourth connecting rod 224 may be an unbuffered rod.

The skid 230 is fixed to the other end of the fifth connecting rod 225 and is configured to support the landing site of the UAV 100. Specifically, in this embodiment, the skid 230 is disposed horizontally and is perpendicular to the fifth connecting rod 225.

It may be understood that in some other embodiments, according to actual requirements, the skid 230 may be not disposed specially, but the fifth connecting rod 225 functions as the skid 230 (that is, when the UAV is landing, the other end of the fifth connecting rod 225 is in contact with the ground).

In some other embodiments, one end of the first connecting rod 221 is connected to the connecting member 213, and is hinged to a second hinge point with the fuselage 10. The other end of the first connecting rod 221 and one end of the fourth connecting rod 224 are hinged to a fifth hinge point. One end of the second connecting rod 222 and the fuselage 10 are hinged to a fourth hinge point, and the other end and the fourth connecting rod 224 are hinged to an eighth hinge point. One end of the third connecting rod 223 and the second connecting rod 222 are hinged to a third hinge point, and the other end and one end of the fifth connecting rod 225 are hinged to a sixth hinge point. The other end of the fourth connecting rod 224 and the fifth connecting rod 225 are hinged to a seventh hinge point. In this case, a portion of the first connecting rod 221, all of the second connecting rod 222, a portion of the fourth connecting rod 224 and a portion of the fuselage 10 constitute a four-link mechanism, and the second hinge point, the fourth hinge point, the fifth hinge point and the eighth hinge point are four vertices of a parallelogram. A portion of the second connecting rod 222, all of the third connecting rod 223, another portion of the fourth connecting rod 224 and a portion of the fifth connecting rod 225 constitute another four-link mechanism, and the third hinge point, the sixth hinge point, the seventh hinge point and the eighth hinge point are four vertices of another parallelogram.

In some other embodiments, one end of the first connecting rod 221 is connected to the connecting member 213, and is hinged to a second hinge point with the fuselage 10. The other end of the first connecting rod 221 and one end of the fourth connecting rod 224 are hinged to a fifth hinge point. One end of the second connecting rod 222 and the fuselage 10 are hinged to a fourth hinge point, and the other end and the fourth connecting rod 224 are hinged to an eighth hinge point. One end of the third connecting rod 223 and the first connecting rod 221 are hinged to a first hinge point, and the other end and one end of the fifth connecting rod 225 are hinged to a sixth hinge point. The other end of the fourth connecting rod 224 and the fifth connecting rod 225 are hinged to a seventh hinge point. In this case, a portion of the first connecting rod 221, all of the second connecting rod 222, a portion of the fourth connecting rod 224 and a portion of the fuselage 10 constitute a four-link mechanism, and the second hinge point, the fourth hinge point, the fifth hinge point and the eighth hinge point are four vertices of a parallelogram. Another portion of the first connecting rod 221, all of the third connecting rod 223, all of the fourth connecting rod 224 and a portion of the fifth connecting rod 225 constitute another four-link mechanism, and the first hinge point, the fifth hinge point, the sixth hinge point and the seventh hinge point are four vertices of another parallelogram.

In some other embodiments, one end of the first connecting rod 221 is connected to the connecting member 213, and is hinged to a second hinge point with the fuselage 10. The other end of the first connecting rod 221 and one end of the fourth connecting rod 224 are hinged to a fifth hinge point. One end of the second connecting rod 222 and the fuselage 10 are hinged to a fourth hinge point, and the other end and the fourth connecting rod 224 are hinged to an eighth hinge point. One end of the third connecting rod 223 and the first connecting rod 221 are hinged to a first hinge point, and is hinged to a third hinge point with the second connecting rod 222. The other end and one end of the fifth connecting rod 225 are hinged to a sixth hinge point. The other end of the fourth connecting rod 224 and the fifth connecting rod 225 are hinged to a seventh hinge point. In this case, a portion of the first connecting rod 221, all of the second connecting rod 222, a portion of the fourth connecting rod 224 and a portion of the fuselage 10 constitute a four-link mechanism, and the second hinge point, the fourth hinge point, the fifth hinge point and the eighth hinge point are four vertices of a parallelogram. A portion of the first connecting rod 221, all of the third connecting rod 223, all of the fourth connecting rod 224 and a portion of the fifth connecting rod 225 constitute another four-link mechanism, and the first hinge point, the fifth hinge point, the sixth hinge point and the seventh hinge point are four vertices of another parallelogram.

In this embodiment, the first connecting rod 221, the second connecting rod 222, the third connecting rod 223, the fourth connecting rod 224 and the fifth connecting rod 225 are straight rods. It may be understood that, in some other embodiments, the first connecting rod 221, the second connecting rod 222, the third connecting rod 223, the fourth connecting rod 224 and the fifth connecting rod 225 are not limited to straight rods, may be curved rods, or may be platelike rods or rods of other irregular shapes, as long as the four hinge points in the undercarriage body 220 are the four vertices of a parallelogram.

In addition, in the embodiment of the present invention, a position that is on the fuselage 10 and that corresponds to the undercarriage 20 is provided with a receiving groove 11. When the UAV 100 takes off, the undercarriage 20 is stowed and partially received in the receiving groove 11, to reduce unnecessary resistance in the air and avoid shielding the aerial vision during the aerial photography of the UAV 100. When landing is required, the undercarriage 20 may be automatically unfolded to support the UAV 100 to complete the landing. Further, when the UAV 100 is not in use, the undercarriage 20 is partially received in the receiving groove 11, which reduces the storage space and facilitates storage and carrying.

Referring to FIG. 4, after the UAV 100 takes off, the drive apparatus 211 drives the threaded rod 212 to rotate, so that the connecting member 213 moves straight downward along the axis direction of the threaded rod 212, and one end that is of the first connecting rod 221 and that is connected to the connecting member 213 moves downward, further causing the first connecting rod 221 to rotate around a second pin shaft 2213, and the other end of the first connecting rod 221 moves upward (that is, the other end of the first connecting rod 221 cocks). The first connecting rod 221 pulls, to move upward, the third connecting rod 223 and the fourth connecting rod 224 as well as the end that is of the second connecting rod 222 and that is connected to the third connecting rod 223, and a distance by which the third connecting rod 223 moves upward is less than a distance by which the fourth connecting rod 224 moves upward. A position of the seventh pin shaft 2234 in a vertical direction being higher than a position of the eighth pin shaft 2243 is changed to a position in the vertical direction being lower than the position of the eighth pin shaft 2243, so that the other end of the fifth connecting rod 225 cocks. Moreover, in a horizontal direction, the third connecting rod 223, the fourth connecting rod 224, and the fifth connecting rod 225 all move toward the fuselage 10. Finally, the undercarriage body 220 is folded on a side portion of the fuselage 10 and partially received in the receiving groove 11 so that the aerial vision is not shielded during the aerial photography of the UAV 100.

When the UAV 100 descends, the drive apparatus 211 drives the threaded rod 212 to rotate reversely, so that the connecting member 213 moves upward along the axis direction of the threaded rod 212, and one end of the first connecting rod 221 moves upward, further causing the first connecting rod 221 to rotate around the second pin shaft 2213, and the other end of the first connecting rod 221 moves downward (that is, the other end of the first connecting rod 221 sags). The first connecting rod 221 drives, to move downward, the third connecting rod 223 and the fourth connecting rod 224 as well as the end that is of the second connecting rod 222 and that is connected to the third connecting rod 223, and a distance by which the third connecting rod 223 moves downward is less than a distance by which the fourth connecting rod 224 moves downward. A position of the seventh pin shaft 2234 in a vertical direction being lower than a position of the eighth pin shaft 2243 is changed to a position in the vertical direction being higher than the position of the eighth pin shaft 2243, so that one end that is of the fifth connecting rod 225 and that is connected to the skid 230 sags. Moreover, in a horizontal direction, the third connecting rod 223, the fourth connecting rod 224, and the fifth connecting rod 225 all move in a direction away from the fuselage 10. The skid 230 becomes the lowest point on the entire UAV 100 and comes into contact with the ground after the UAV 100 descends.

Figure 5:
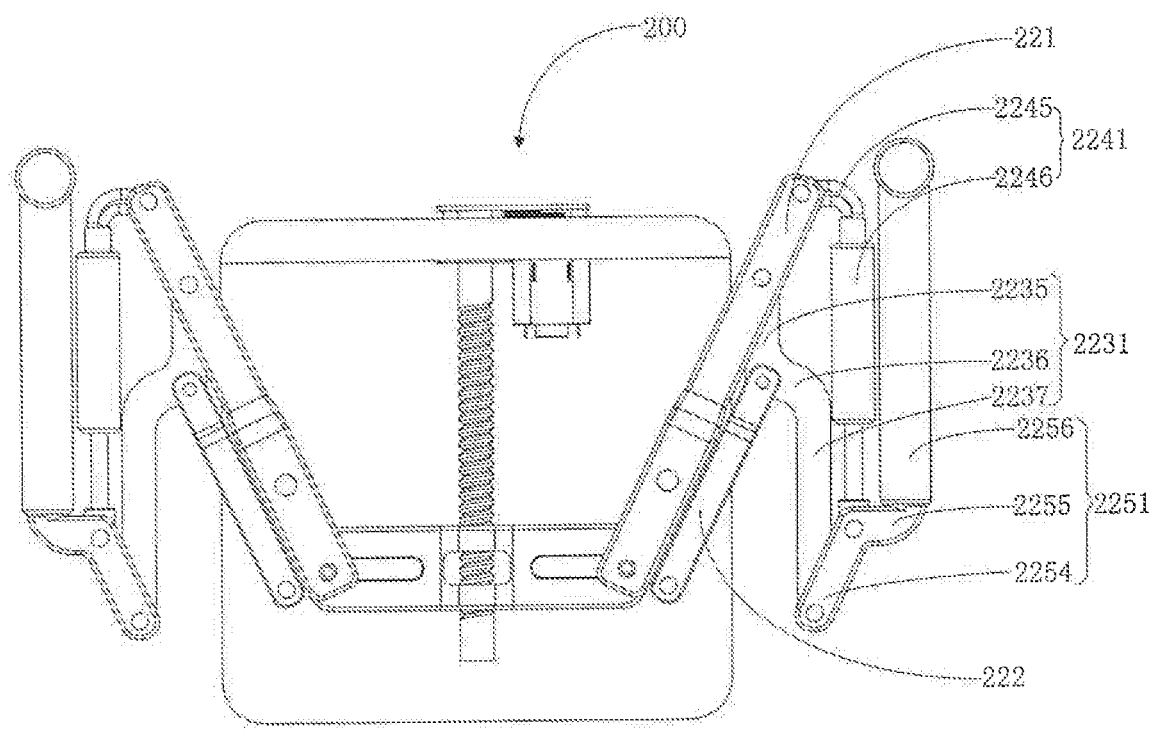
FIG. 5 is a cross-sectional view of an unmanned aerial vehicle according to another embodiment of the present invention, where an undercarriage is in an unfolded state.

Referring to FIG. 5, an unmanned aerial vehicle (UAV) 200 provided in the second embodiment of the present invention is basically the same as the UAV 100 provided in the first embodiment, and a difference therebetween is as follows. The third connecting rod body 2231 includes a first portion 2235 hinged to the first connecting rod 221 and the second connecting rod 222, a first curved portion 2236 connected to the first portion and a second portion 2237 connected to the first curved portion 2236. Both the first portion 2235 and the second portion 2237 are disposed parallel to the fourth connecting rod 224. The fourth connecting rod body 2241 includes a second curved portion 2245 hinged to the first connecting rod 221 and a vertical portion 2246 connected to the second curved portion 2245. The vertical portion 2246 is connected between the second curved portion 2245 and the fifth connecting rod 225. The fifth connecting rod body 2251 includes a third portion 2254 hinged to the third connecting rod 223 and the fourth connecting rod 224, a third curved portion 2255 connected to the third portion and a fourth portion 2256 connected to the third curved portion 2255, one end that is of the fourth portion 2256 and that is away from the third curved portion 2255 being connected to the skid 230.

After the undercarriage 20 of the UAV 200 of this embodiment is folded, the fifth connecting rod 225, the third connecting rod 223 and the fourth connecting rod 224 are parallel to each other, and the spacing therebetween is smaller, so that after the undercarriage 20 is folded, the structure is more compact and occupies less space.

Figure 6:
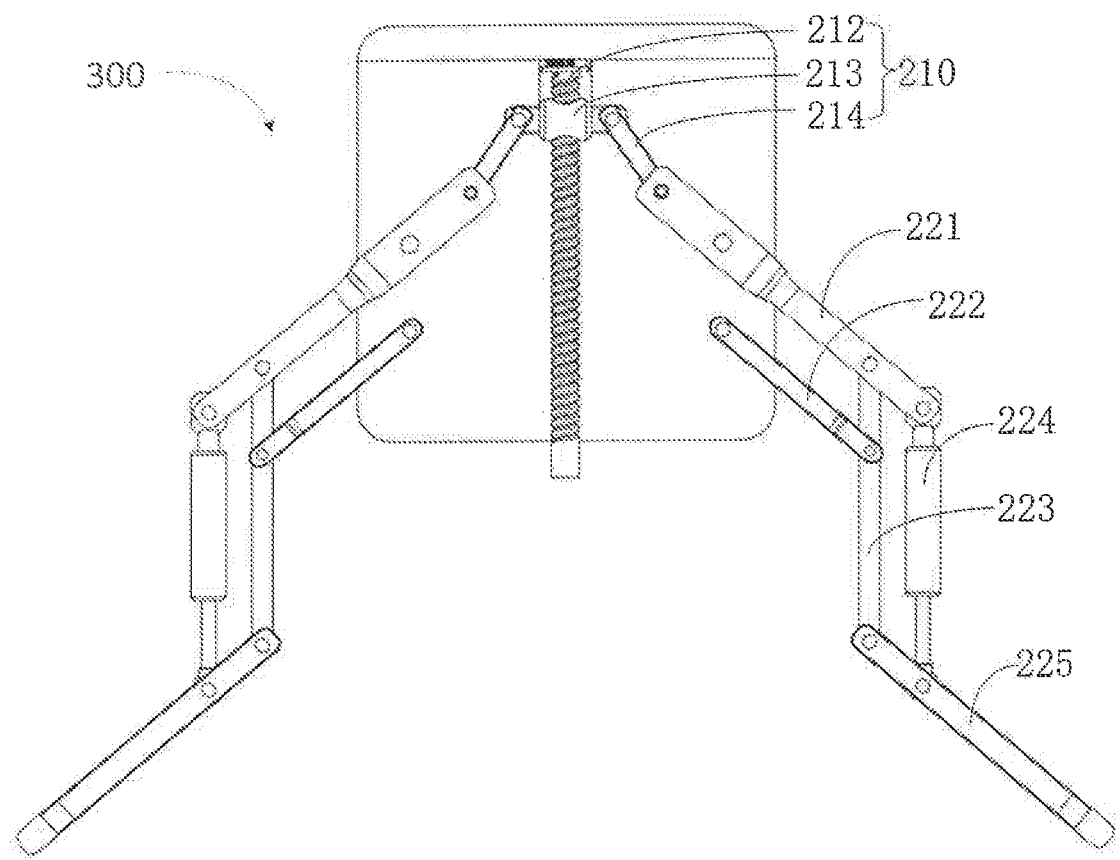
FIG. 6 is a cross-sectional view of an unmanned aerial vehicle according to still another embodiment of the present invention, where an undercarriage is in an unfolded state.

Referring to FIG. 6, an unmanned aerial vehicle (UAV) 300 provided in the third embodiment of the present invention is basically the same as the UAV 100 provided in the first embodiment, and a difference therebetween is as follows. The power assembly 210 further includes a connecting rod 214, and both sides of the threaded hole 2131 are not provided with a sliding groove 2132, respectively. One end of the connecting rod 214 is hinged to the connecting member 213, and the other end is hinged to one end of the first connecting rod 221.

The connecting rod 214 additionally disposed for the UAV 300 in this embodiment makes the connection between the connecting member 213 and the first connecting rod 221 more stable, which may effectively avoid the influence of vibration of the UAV 300 on the undercarriage 20 during the flight of the UAV 300.

Figure 7:
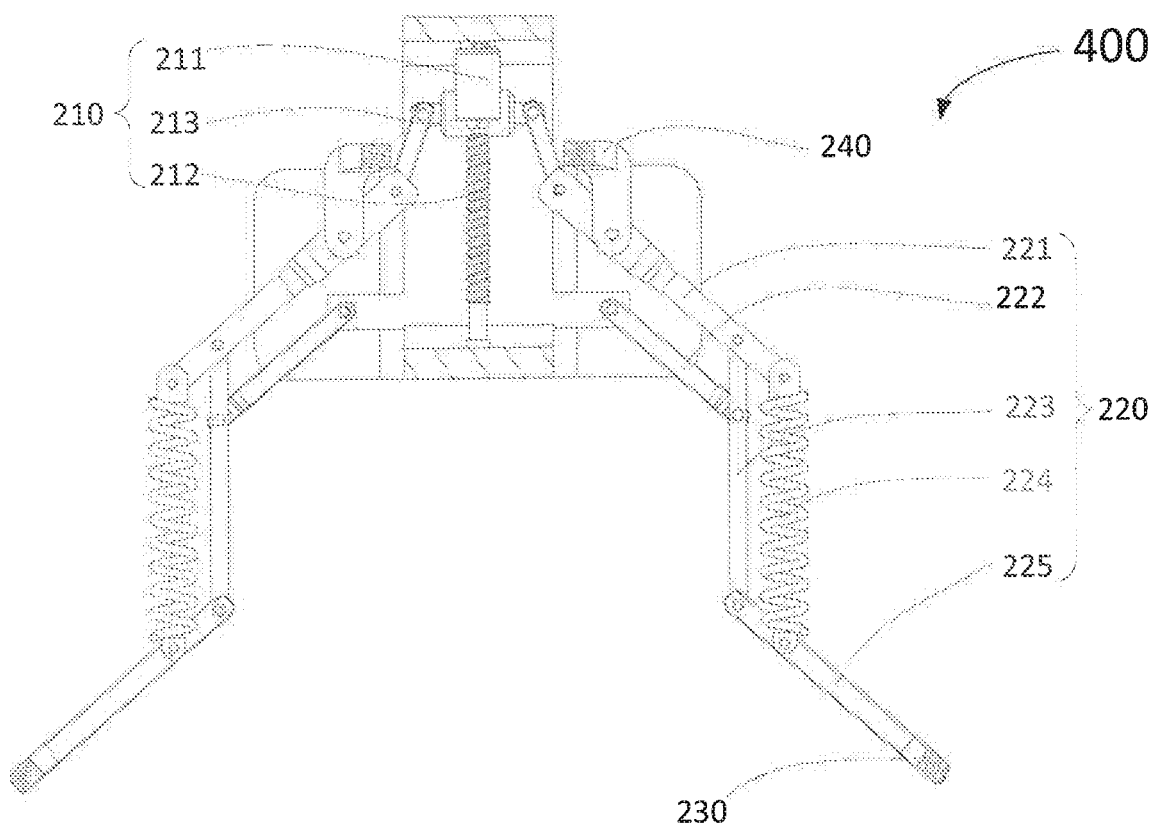
FIG. 7 is a cross-sectional front view of an unmanned aerial vehicle according to yet another embodiment of the present invention, where an undercarriage is in an unfolded state.
Figure 8:
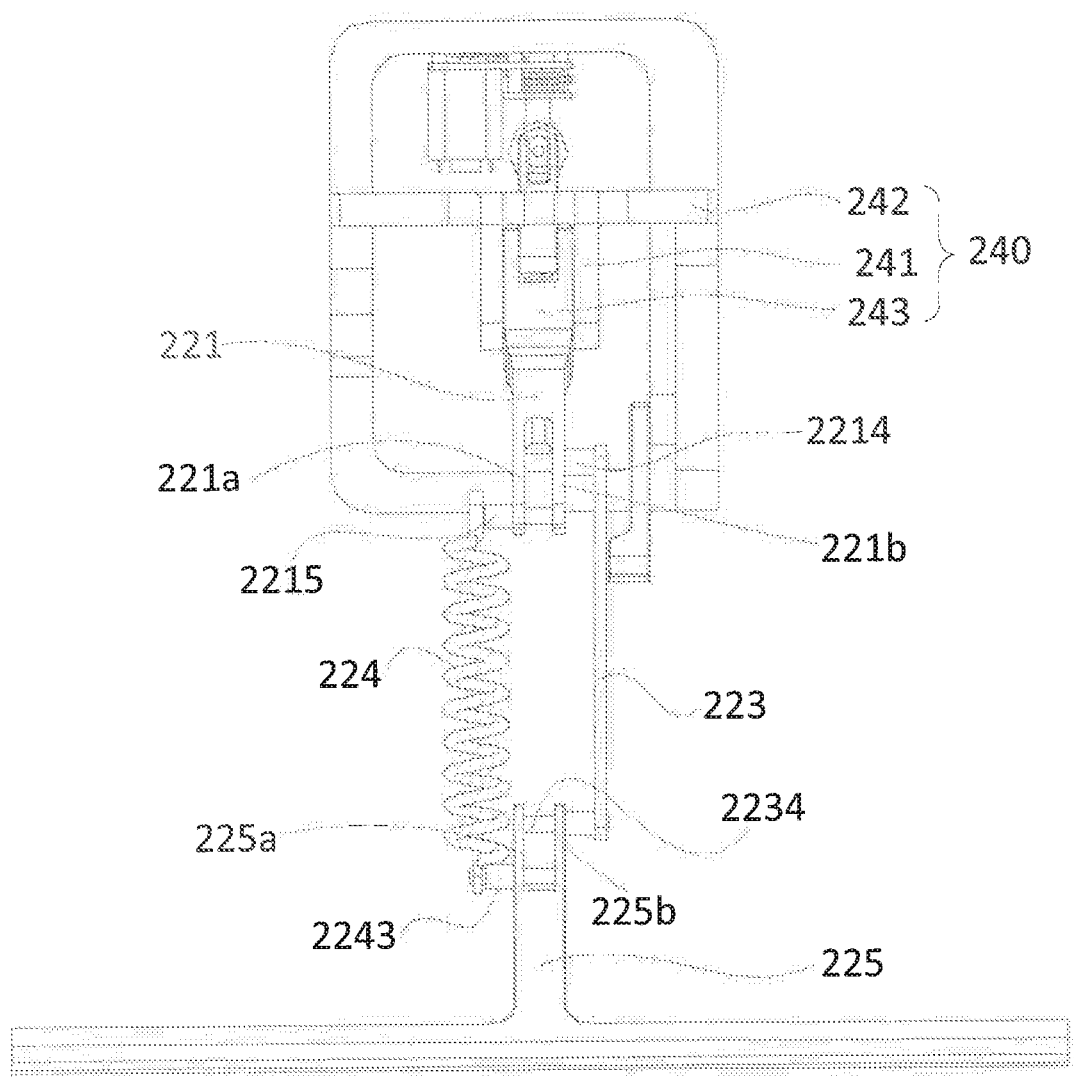
FIG. 8 is a cross-sectional side view of the UAV shown in FIG. 7, where an undercarriage is in an unfolded state.
Figure 9:
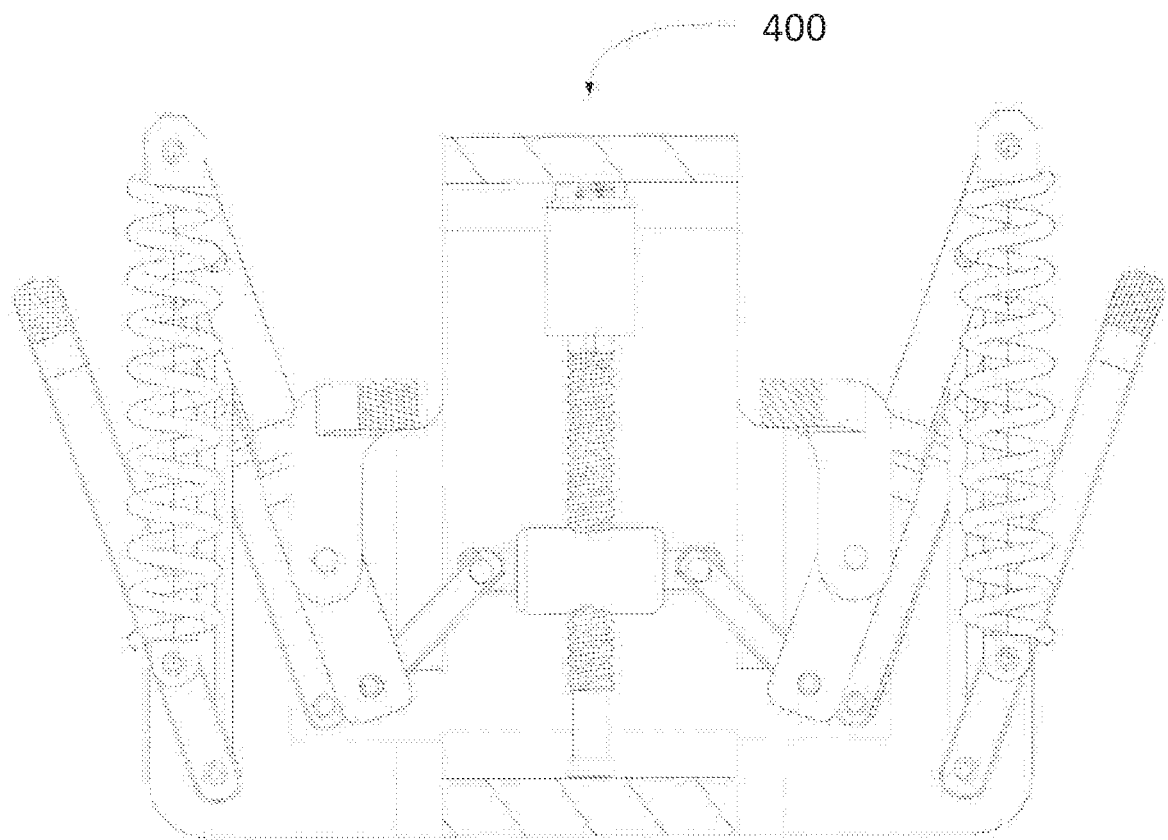
FIG. 9 is a cross-sectional front view of the UAV shown in FIG. 7, where an undercarriage is in a folded state.

Referring to FIG. 7 to FIG. 9, an unmanned aerial vehicle (UAV) 400 provided in the fourth embodiment of the present invention is basically the same as the UAV 100 provided in the first embodiment, and a difference therebetween is as follows. At least two hinged connecting rods are staggered forward and rearward in space, that is, in this embodiment, projections of the at least two hinged connecting rods on a side face (a left side face or a right side face) of a fuselage 10 are staggered. For example, projections of the first connecting rod. 221 and the second connecting rod 222 on the side face of the fuselage 10 are staggered.

For another example, as shown in FIG. 8, in this embodiment, the first connecting rod 221 includes a first side plate 221a and a second side plate 221b that are disposed opposite to each other at an interval, and a fifth connecting rod 225 includes a third side plate 225a and a fourth side plate 225b that are disposed opposite to each other at an interval.

One end of the third connecting rod 223 is hinged to the first connecting rod 221 through a third pin shaft 2214, and the other end is hinged to the fifth connecting rod 225 through a seventh pin shaft 2234. A third pin shaft 2214 is inserted between the first side plate 221a and the second side plate 221b, and one end of the third pin shaft 2214 extends in a direction away from the second side plate 221b. A seventh pin shaft 2234 is inserted between the third side plate 225a and the fourth side plate 225b, and one end of the seventh pin shaft 2234 extends in a direction away from the fourth side plate 225b.

One end of the fourth connecting rod 224 is hinged to the first connecting rod 221 through a fourth pin shaft 2215, and the other end is hinged to the fifth connecting rod 225 through an eighth pin shaft 2243. A fourth pin shaft 2215 is inserted between the first side plate 221a and the second side plate 221b, and one end of the fourth pin shaft 2215 extends in a direction away from the first side plate 221a. An eighth pin shaft 2243 is inserted between the third side plate 225a and the fourth side plate 225b, and one end of the eighth pin shaft 2243 extends in a direction away from the third side plate 225a.

One end of the third connecting rod 223 is hinged to one end that is of the third pin shaft 2214 and that extends away from the second side plate 221b, and the other end is hinged to one end that is of the seventh pin shaft 2234 and that extends in a direction away from the fourth side plate 225b. One end of the fourth connecting rod 224 is hinged to one end that is of the fourth pin shaft 2215 and that extends in a direction away from the first side plate 221a, and the other end is hinged to one end that is of the eighth pin shaft 2243 and that extends in a direction away from the third side plate 225a.

Accordingly, one end of the third connecting rod 223 and one end of the fourth connecting rod 224 are respectively hinged to two opposite sides of the first connecting rod 221, and the first connecting rod 221 and the second connecting rod 222 are respectively hinged to two opposite sides of the third respectively 223. The fifth connecting rod 255 is hinged between the other end of the third connecting rod 223 and the other end of the fourth connecting rod 224, so that the projections of the second connecting rod 222, the third connecting rod 223, the first connecting rod 221. (or the fifth connecting rod 225) and the fourth connecting rod 224 on the side face of the fuselage 10 are staggered.

In addition, as shown in FIG. 7, on a front projection of the fuselage 10, a portion of the first connecting rod 221, all of the second connecting rod 222, a portion of the third connecting rod 223 and a portion of the fuselage 10 constitute a parallelogram; and Another portion of the first connecting rod 221, all of the third connecting rod 223, all of the fourth connecting rod 224 and a portion of the fifth connecting rod 225 constitute another parallelogram, so that two parallelogram mechanisms are formed.

In this embodiment, the process of folding or unfolding the undercarriage 20 is similar to that provided in the previous embodiment, but since the first connecting rod 221, the second connecting rod 222, the third connecting rod 223 and the fourth connecting rod 224 are staggered forward and rearward in space, in this embodiment, when the undercarriage 20 is folded or unfolded, each connecting rod is translated in a relatively independent plane without interference with each other, thereby improving fluency of folding the undercarriage 20. In addition, when the undercarriage 20 is completely folded, as shown in FIG. 9, the projections of the first connecting rod 221, the second connecting rod 222, the third connecting rod 223 and the fourth connecting rod 224 on the front face overlap, and the fifth connecting rod 225 is closer to the first connecting rod 221. Therefore, in this embodiment, after the undercarriage 20 is folded, the structure is more compact and occupies less space.

Moreover, in some embodiments, referring to FIG. 7 and FIG. 8 together, the fuselage 20 may further include a reinforcing member 240, the reinforcing member 240 including a body portion 242 connected to the fuselage 10 and an extending portion 241 with one end connected to the body portion 242. The first connecting rod 221 is hinged to the other end of the extending portion 241 at a position between one end connected to the connecting member 213 and the other end hinged to the fourth connecting rod 224. A limiting groove 243 may further be provided in the extending portion 241, the first connecting rod 221 being hinged in the limiting groove 243. When the undercarriage 20 is folded or unfolded, the first connecting rod 221 rotates about a hinge point of the first connecting rod 221 and the extending portion 241 in the limiting groove 243, until the first connecting rod 221 abuts against the reinforcing member 240. In this embodiment, the reinforcing member 240 is additionally disposed in the undercarriage 20, so that an inclination angle of the first connecting rod 221 may be limited when the undercarriage 20 is unfolded, thereby enhancing the stability of the undercarriage 20 during landing. It may be understood that, in some other embodiments, the reinforcing member 240 may further be hinged to the fuselage 10. In addition, an elastic element is provided at a hinge position between the reinforcing member 240 and the fuselage 10, and the elastic element may be a torsion spring, an elastic piece, and the like. One end of the elastic element is fixedly connected to the fuselage 10, and the other end is fixedly connected to the reinforcing member 240. Based on the foregoing structure, the fourth connecting rod 224 may be an ordinary connecting rod, and when the undercarriage 20 lands, vibration damping may be achieved through the elastic element.

For the UAV 400 of this embodiment, the at least two hinged connecting rods are staggered forward and rearward in space, thereby improving the fluency of folding the undercarriage 20, so that the structure is more compact and occupies less space after the undercarriage 20 is folded.

It may be understood that, in practical application, the technical features involved in the foregoing embodiments 1 to 3 may be applied to this embodiment as long as they do not conflict with this embodiment, and details are not described herein again.

It may be understood that, in some other embodiments, the undercarriage body 220 in the UAVs 100, 200, 300, 400 may include only the first connecting rod 221, the second connecting rod 222 and the third connecting rod 223 according to actual requirements. Connection relationships between the first connecting rod 221 and the second connecting rod 222 as well as the third connecting rod 223, and connection relationships between the first connecting rod 221 and the second connecting rod 222 as well as the fuselage 10 and the power assembly 210 may be the same as the connection relationship described in any of Embodiments 1-4, and details are not described herein again. The third connecting rod 223 may be used as a skid to support the landing of the UAV, or the other end of the third connecting rod 223 is fixedly connected to the skid 230.

It may be understood that, in the embodiment of the present invention, that the connecting member performs straight reciprocating motion is used as an example for description, but those skilled in the art may understand that the present invention is not limited to the straight reciprocating motion, and other reciprocating motion such as arc or curved reciprocating motion may also achieve the purpose of the present invention.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although detailed description has been given to the present invention with reference to the embodiments, it should be understood by those skilled in the art that: they can still make modifications to the technical solutions described in the foregoing embodiments or make equivalent substitutions to some technical features thereof, without departing from scope of the technical solutions of the embodiments of the present invention.

What is claimed is:

1. An undercarriage for an unmanned aerial vehicle (UAV), the UAV comprising a fuselage, wherein the undercarriage comprises:
    a power assembly configured to be mounted to the fuselage, the power assembly comprising a connecting member and a drive apparatus for driving the connecting member to reciprocate; and
    an undercarriage body comprising a plurality of hinged connecting rods, the plurality of hinged connecting rods constituting at least one parallelogram mechanism, and projections of at least two of the hinged connecting rods on a side face of the fuselage being staggered; the undercarriage body being connected to the connecting member, and when the connecting member reciprocates, the undercarriage body being driven to be folded or unfolded; and
    wherein the undercarriage body comprises a first connecting rod, a second connecting rod, a third connecting rod, a fourth connecting rod and a fifth connecting rod;
    one end of the first connecting rod, rod being hinged to the connecting member, the other end of the first connecting rod being hinged to one end of the fourth connecting rod, and the first connecting rod being hinged to the fuselage at a position between one end connected to the connecting member and the other end hinged to the fourth connecting rod;
    one end of the second connecting rod being hinged to the fuselage, and the other end being hinged to the third connecting rod and the fourth connecting rod, respectively; and one end of the third connecting rod being hinged to the second connecting rod, and the other end of the third connecting rod and the other end of the fourth connecting rod being hinged to the fifth connecting rod, respectively.

2. The undercarriage according to claim 1, wherein one end of the third connecting rod being hinged to the second connecting rod, and one end of the hinge extending in a direction away from the fifth connecting rod and being hinged to the first connecting rod.

3. The undercarriage according to claim 2, wherein the third connecting rod comprises a first portion hinged to the first connecting rod and the second connecting rod, a first curved portion connected to the first portion and a second portion connected to the first curved portion; and both the first portion and the second portion being disposed parallel to the fourth connecting rod.

4. The undercarriage according to claim 1, wherein the undercarriage body comprises a first connecting rod, a second connecting rod, a third connecting rod, a fourth connecting rod and a fifth connecting rod;
    one end of the first connecting rod being hinged to the connecting member, the other end of the first connecting rod being hinged to one end of the fourth connecting rod, and the first connecting rod being hinged to the fuselage at a position between one end connected to the connecting member and the other end hinged to the fourth connecting rod;
    one end of the second connecting rod being hinged to the fuselage, and the other end being hinged to the third connecting rod or the fourth connecting rod; and one end of the third connecting rod being hinged to the first connecting rod, and the other end of the third connecting rod and the other end of the fourth connecting rod being hinged to the fifth connecting rod, respectively.

5. The undercarriage according to claim 1, wherein the fourth connecting rod comprises a second curved portion hinged to the first connecting rod and a vertical portion connected to the second curved portion, the vertical portion being connected between the second curved portion and the fifth connecting rod.

6. The undercarriage according to claim 1, wherein the fifth connecting rod comprises a third portion hinged to the third connecting rod and the fourth connecting rod, a third curved portion connected to the third portion and a fourth portion connected to the third curved portion.

7. The undercarriage according to claim 1, wherein the undercarriage further comprises a skid, the skid being connected to the fifth connecting rod.

8. The undercarriage according to claim 1, wherein projections of the first connecting rod and the second connecting rod on a side face of the fuselage are staggered.

9. The undercarriage according to claim 8, wherein the first connecting rod comprises a first side plate and a second side plate that are disposed opposite to each other at an interval, and the fifth connecting rod comprises a third side plate and a fourth side plate that are disposed opposite to each other at an interval;

one end of the third connecting rod being hinged to the first connecting rod through a third pin shaft, and the other end being hinged to the fifth connecting rod through a seventh pin shaft; the third pin shaft being inserted between the first side plate and the second side plate, and one end of the third pin shaft extending in a direction away from the second side plate, the seventh pin shaft being inserted between the third side plate and the fourth side plate, and one end of the seventh pin shaft extending in a direction away from the fourth side plate;

one end of the fourth connecting rod being hinged to the first connecting rod through a fourth pin shaft, and the other end being hinged to the fifth connecting rod through an eighth pin shaft; the fourth pin shaft being inserted between the first side plate and the second side plate, and one end of the fourth pin shaft extending in a direction away from the first side plate, the eighth pin shaft being inserted between the third side plate and the fourth side plate, and one end of the eighth pin shaft extending in a direction away from the third side plate;

one end of the third connecting rod being hinged to one end that is of the third pin shaft and that extends away from the second side plate, and the other end of the third connecting rod being hinged to one end that is of the seventh pin shaft and that extends in a direction away from the fourth side plate; and one end of the fourth connecting rod being hinged to one end that is of the fourth pin shaft and that extends in a direction away from the first side plate, and the other end of the fourth connecting rod being hinged to one end that is of the eighth pin shaft and that extends in a direction away from the third side plate.

10. The undercarriage according to claim 1, wherein the fuselage further comprises a reinforcing member, the reinforcing member comprising a body portion connected to the fuselage and an extending portion with one end connected to the body portion, and the first connecting rod being hinged to the other end of the extending portion at a position between one end connected to the connecting member and the other end hinged to the fourth connecting rod.

11. The undercarriage according to claim 1, wherein the power assembly comprises a threaded rod connected to the drive apparatus, the connecting member being sleeved on the threaded rod and being screwed to the threaded rod, the drive apparatus driving the threaded rod to rotate, and the connecting member reciprocating along the threaded rod.

12. The undercarriage according to claim 11, wherein a middle portion of the connecting member is screwed to the threaded rod, the connecting member being further provided with sliding grooves on both sides of a portion screwed to the threaded rod, and one end of the first connecting rod being hinged in the sliding groove and sliding along the sliding groove.

13. An unmanned aerial vehicle (UAV), wherein the UAV comprises the undercarriage according to claim 1.

* * * * *